Sept. 16, 1969 R. W. WILLIAMS 3,467,392

STEREOPHONIC ASSEMBLY

Filed Sept. 13, 1967

INVENTOR

RICHARD W. WILLIAMS

BY

Richard W. Law

ATTORNEY

United States Patent Office 3,467,392
Patented Sept. 16, 1969

3,467,392
STEREOPHONIC ASSEMBLY

Richard W. Williams, 1075 S. Dover St., Lakewood, Colo. 80226

Filed Sept. 13, 1967, Ser. No. 667,471
Int. Cl. G11b 1/02
U.S. Cl. 274—2 6 Claims

ABSTRACT OF THE DISCLOSURE

A stereophonic assembly for a tape deck, record player and/or radio includes a generally completed closed cabinet housing and a removable frame or chassis for holding the entire sound reproducing apparatus inclusive of amplifiers, tuners, tape decks, record players, speakers, etc. Grills are mounted on two opposite sides of the cabinet for passage of sound emitted in opposite directions and the frame is spaced from the cabinet walls, leaving a space therebetween for ventilation through said grills and for sound resonances.

Stereophonic sound reproducing apparatus generally utilizes two spaced-apart speakers, each with its own amplifier controls, and each reproducing, in general, a predetermined sound frequency range which is different from the other, for example a bass range for one speaker and a treble range for the other. Such devices may be only radio, a radio combined with a record player or a radio combined with a record player and/or a tape deck. As the number of different types of sound reproducing units increases, the cabinets for housing the same have heretofore substantially increased in size and complexity. In available systems the sound reproducing equipment is separate from the speakers which are separately attached to the frame of the cabinet, and each sound reproducing unit is separate from the others separately attached to the cabinet frame. When such units are in need of extensive repair the entire unit, including the cabinet, is removed from its location and taken to a shop for repair since the components of the system can only be individually removed from the cabinet and its framework. Additionally, the backs of such cabinets have had to be left essentially open for ventilation of the electrical equipment which heats substantially during operation.

The cabinets of most sound reproducing equipment has heretofore been made in rectangular shape, and many of the cabinets are made as a piece of fine furniture. Some such units are quite large in size, with a combination radio, record player and speakers housed in a cabinet which may extend from four to six feet or more in length. Purchase or replacement of such a large unit obviously creates problems in the decor of the house.

According to the present invention we have provided a compact, completely enclosed cabinet for housing a unitized sound reproducing assembly which may be easily and readily completely removed in a single operation from the cabinet. The unitized assembly includes a record player, a radio and/or a tape deck along with speakers necessary for a stereophonic system. The assembly provides means for a resonance chamber in the cabinet, and, furthermore, provides ventilation for the electrical system without having the back of the unit opened and exposed. The basic type of cabinet of the invention is a commode piece of furniture, which is in effect a low table of generally uniform shape and may include a hexagon shape, octagon shape, round shape, etc.

Included among the objects and advantages of the present invention is a stereophonic sound reproducing unit having a cabinet and a unitized sound reproducing assembly which includes all of the components and electrical gear of the sound reproducing unit which is easily moved into and out of the cabinet as a unit.

Another object of the invention is to provide a unitized stereophonic sound reproducing assembly which is easily and quickly assembled with or removed as a unit from a cabinet.

A further object of the invention is to provide a stereophonic sound reproducing unit mounted in an enclosed cabinet which provides ventilation for the electrical equipment in use and a sound resonance chamber.

These and other objects and advantages of the invention may be readily ascertained by referring to the following description and appended illustrations in which.

Figure 1:
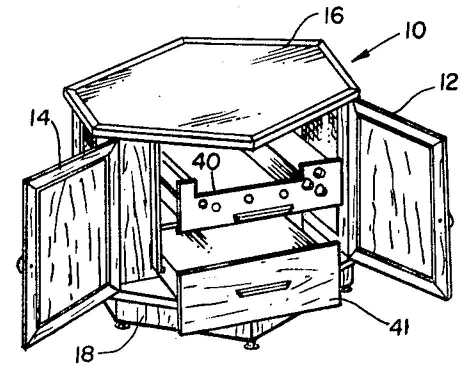
FIG. 1 is a perspective view of a stereophonic sound reproducing unit according to the invention illustrating the completed assembly of the cabinet and unitized assembly for the electrical components.
Figure 2:
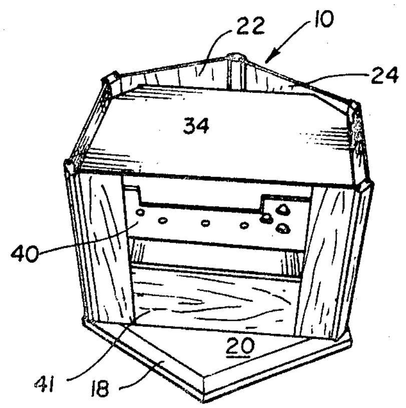
FIG. 2 is a top perspective view of a portion of the assembly of FIG. 1, with the top and doors removed.
Figure 3:
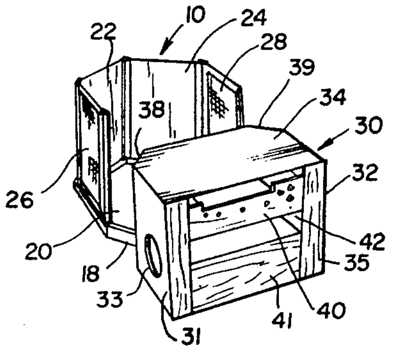
FIG. 3 is a composite figure illustrating a housing, with top removed and the unitized sound reproducing assembly.
Figure 5:
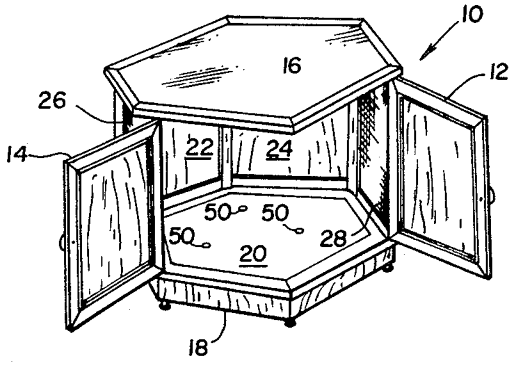
FIG. 5 is a perspective view of a cabinet for receiving a sound reproducing unit according to the invention.
Figure 6:
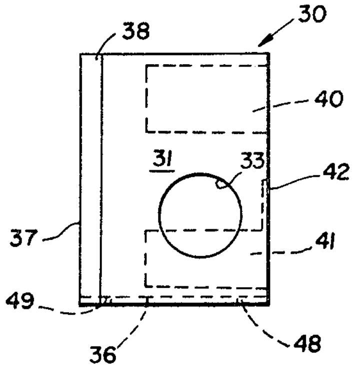
FIG. 6 is a side elevational view of a framework for holding the sound reproducing elements of a stereophonic sound reproducing system as an integrated unit.

In the device selected for illustration a commode type cabinet 10 is provided with doors 12 and 14 arranged to open to substantially expose the entire width of the unit. The cabinet illustrated is of a hexagon shape, including a top 16 and a base 18. A bottom 20 of plywood or like is secured to the base and provides a floor for the cabinet interior and an anchor for a unitized or integrated sound reproducing system, explained below. The cabinet is preferably made of wood, which may be solid or veneer, and the top may be of any material to go with the decor of the location for which it is purchased. For example, a top may be made of a hard synthetic plastic, leather, marble, wood, or the like. Further, the shape of the commode-type furniture may be hexagonal, octagonal, round, or the like, and preferably, should not be higher than about 22 inches so that it may form a table useful as a corner table, end table, or the like. The cabinet structure, shown in FIGURES 3 and 5 includes solid back portions 22 and 24. A pair of sides 26 and 28, which are opposed for directing sound outwardly in opposed directions, each includes a filigree grill or framework for a speaker grill and ventilation as set out below. Preferably the filigree is a grill or latticework system rather than a conventional cloth to provide for free movement of air for ventilation of the electrical equipment.

A sound reproducing assembly, shown in general by number 30, includes a pair of sides 31 and 32 each of which includes a lower speaker side 31 having opening 33, in which is mounted a speaker, thereby providing a speaker on each side of the assembly directed outwardly. The framework and the assembly, also, includes a top 34, an open front 35, a bottom 36 and a back 37. Mitered corners 38 and 39 complete the assembly. The front is arranged for holding drawers, for example upper drawer 40 and a lower drawer 41. The upper drawer 40 is arranged for holding a tape deck, and the lower drawer is arranged for a record player. These drawers are spaced apart and are arranged on conventional drawer guides so that they may be pulled out for operation. Any of various conventional stops may be used to prevent the drawers from being pulled completely out. The space 42 (FIG. 3) between the upper and lower drawers may be used for mounting a radio, which may be secured in position by screws and bolts or the like. All of the electrical components will very easily fit in a housing, such as illustrated, and all parts are easily accessible when the unitized system is removed from the cabinet. When a wire or other type of antenna is required for the radio, the same may be coiled against and/or mounted on the top 34 or the back 37 of the unit. Where desired input and output jacks may be provided for the radio, the tape deck or record player section for additional units or speakers for the device. The inner framework for the unitized system is secured to the outer cabinet by means of three bolts, not shown, fastened through openings 48 and 49 in the inner cabinet arranged to mate with holes 50 in the bottom 20 of the cabinet. These bolts are easily accessible by removing the record player drawer 41. Thus, the sound reproducing components in the unitized housing are easily assembled and removed from the outside cabinet.

Figure 4:
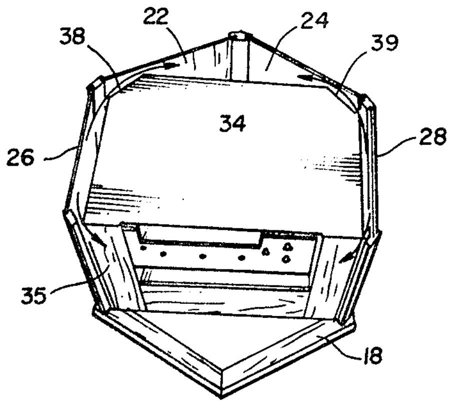
FIG. 4 is a top perspective view of an assembly of the invention, illustrating the ventilation system and a resoance chamber.

The assembly of unitized framework for the sound reproducing systems, as shown in FIG. 4, provides ventilation spaces from the grill to the electrical systems through spaces between the front corners and the rear corners permitting air to pass into and out of the filigree sides 26 and 28. This provides a release for the heat produced by the operation of the electrical system. Where tube units are used in the sound reproducing system, the distance between the outer cabinet and the inner framework should, of course, be increased since the tubes produce more heat than solid state circuitry. A space is left between the mitered corners 38 and 39 and the cabinet so that sound passes around the corner into the space between the back 37 of the inner framework and the two back cabinet walls 24 and 25, forming a resonance chamber for high fidelity reproduction of the sound. The speakers of the system are mounted in the lower part of the side panels giving a low mounting of the speakers a short distance above the floor to give the flow of sound along the floor which is important in getting good distribution of the sound and eliminating point sources that irritate a listener.

The system of the invention is particularly effective when the unit is placed in a corner since the reproduced sound will bounce off the walls and reverberate into the room, and by carefully balancing the sound from the speakers, the entire room is filled with the stereophonic sound. When made as a fine piece of furniture, the cabinet need not be removed when repairs are required for the sound reproducing equipment. The lower drawer is removed and by removing the three bolts and the entire sound reproducing unit is removed and taken to a shop. The cabinet, however, does not need to be removed and the decor of the house is not upset while the unit is being replaced. Further, in the production of the unit, the sound system may be produced in a shop completely separate from the cabinet, which may be produced in a cabinet shop, and the assembly of the two is simply a matter of placing the three bolts in the aligned holes when the inner unit is placed in the outer unit. In this manner the assemblers of the electrical equipment need not be in contact with the cabinet which is easily damaged. Furthermore, economy is found in the manufacturing since the sound reproducing entire unit may be prepared and may be suitable for a number of types of cabinets, therefore, redesign of the interior portions of the cabinets need not be accomplished each time a design of the cabinet is desired. Standardization is, therefore, possible with the sound reproducing unit, and an exterior cabinet may be designed to accommodate the unitized system.

While the invention has been illustrated by reference to a particular embodiment there is no intent to limit the spirit of the scope of the invention to the precise details so set forth.

I claim:

1. A stereophonic sound reproducing assembly comprising a closed cabinet of a commode type having opposed sides, a back and a fixed top not essentially higher than a normal table and a short base whereby the cabinet proper is positioned close to the floor, said cabinet having at least one door which when open exposes a major portion of the width of the inside of the cabinet, and having an opening in each said opposed sides; grill means mounted to cover said opening in each said opposed sides of said cabinet for passage of sound emitted in substantially opposite directions; an inner frame means receivable in said cabinet and having a width less than the opening exposed by said door and releasably mounted in said cabinet including a top, a pair of opposed sides in position to register with said grill means but spaced therefrom, a back, and a bottom and arranged to support one complete sound reproducing assembly mounted therein including a pair of opposed speakers mounted in said pair of opposite sides of said inside frame means at a lower position and arranged to project sound waves through said grille means; said inner frame means fitting in said cabinet spaced from the cabinet walls and the cabinet top leaving a passage therebetween providing ventilation for the sound reproducing means through said grille means, there being a space between the back of said inner frame and said cabinet arranged as a resonance chamber whereby sound waves travel through said passage into said resonance chamber, and fastening means between the bottom of said inner frame means and said cabinet for temporarily securing the same together.

2. A stereophonic sound reproducing assembly according to claim 1 wherein said cabinet is a hexagon in cross-section.

3. A stereophonic sound reproducing assembly according to claim 1 wherein said inner frame means includes a closed bottom seating in flush contact with the floor of said cabinet.

4. A stereophonic sound reproducing assembly according to claim 1 wherein a pair of doors are mounted on said cabinet opening outwardly from each other to expose substantially the maximum width of the cabinet.

5. A stereophonic sound reproducing assembly according to claim 2 wherein said inner frame means is essentially rectangular in cross-section and is positioned centerwise of and spaced from the wall of said cabinet, leaving a passage therearound.

6. A stereophonic sound reproducing assembly according to claim 2 wherein two sides open to form said parts of at least one door, and said grille means are adjacent to and spaced from said at least one door.

References Cited

UNITED STATES PATENTS 2,777,902 1/1957 Goldmark ............ 274—2

FOREIGN PATENTS 346,369 6/1960 Switzerland.
327,413 4/1930 Great Britain.

LEONARD FORMAN, Primary Examiner

R. A. FIELDS, Assistant Examiner

U.S. Cl. X.R.

312—8